3,421,842
PROCESS FOR PRODUCING EFFERVESCENT
PERBORATE COMPOUNDS
Leonard R. Darbee, Trenton, William C. De Kleine, Skillman, and Paul R. Mucenieks, Trenton, N.J., assignors to FMC Corporation, New York, N.Y., a corporation of Delaware
No Drawing. Filed Sept. 30, 1965, Ser. No. 491,810
U.S. Cl. 23—60                        5 Claims
Int. Cl. C01b 15/12

ABSTRACT OF THE DISCLOSURE

Alkali metal, ammonium or alkaline earth metal perborate salts are converted to perborate-derived products which effervesce and give off oxygen when in contact with water by suspending particles of said perborate salts in a stream of inert gas, maintaining the average distance between the particles at least about 0.07 times the diameter of the particles, heating the perborate salts while in a suspended state to a temperature of from about 50 to about 250° C. but below the melting point of the particles during said conversion, maintaining the water vapor content of the inert gas surrounding the suspended particles sufficiently low that it does not decompose the perborate-derived product, and continuing said heating until water evolved during the conversion has been removed.

---

This invention relates to a novel process for manufacturing compounds which effervesce when placed in water, and, more specifically, to perborate compounds which have this effervescent property.

Certain perborate compounds that give off oxygen when placed in water or other similar solvents, e.g., alcohols, are known. In general these compounds are produced by heating perborates to temperatures ranging from 50° to 250° C. The thermal conversion generally is carried out in conventional kettles or even rotary drums, water vapor being removed during the conversion. The reaction proceeds as follows:

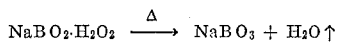

wherein $NaBO_2 \cdot H_2O_2$ represents sodium perborate monohydrate and $NaBO_3$ represents the perborate-derived product. The prior art also teaches that the reaction can be enhanced by carrying out the heating under vacuum or by passing a dry, inert gas or air over the heated mass to facilitate the removal of water vapor.

These processes have serious drawbacks when employed on a commercial scale. Among these is that material amounts of the perborate-derived product are destroyed during the heating step. This is due in part to the presence of local overheating and to the inability to remove the water from the system fast enough to prevent evolved water from building up and decomposing a portion of the final product. Also, some agglomeration results in large scale operations because of surface fusion of the particles during the conversion of the perborate to its effervescent form.

In addition, the overall workability of the process has not been satisfactory because of very poor heat exchange and temperature control between the heated container and the particles of perborate. Without such temperature control, the reaction often gets out of control and results in an explosion within the reaction vessel. As a result there is a need for a porcess for producing these perborate-derived products which avoids these difficulties and which gives a product having uniformly high "gaseous oxygen" contents.

It is an object of the present invention to produce perborates capable of effervescing in water in a simple and readily workable process which gives uniformly high "gaseous oxygen" contents.

It is a further object to produce such perborate-derived products by a process which yields a finely powdered product that is not agglomerated or caked and which can be produced rapidly and efficiently.

We have found that either alkali metal, ammonium or alkaline earth metal perborate salts can be converted to a perborate-derived product which effervesces when in contact with water by suspending particles of the perborate in a stream of inert gas and maintaining the average distance between the particles at least about 0.07 times the diameter of the particles, heating the perborate salt while in a suspended state to a temperature of from about 50° C. to about 250° C. but below the melting point of the particles during the conversion until water evolved during conversion has been removed, and recovering a finely divided, free-flowing, perborate-derived product high in "gaseous oxygen" content which effervesces when in contact with water.

The term "gaseous oxygen" refers to the oxygen in the perborate-derived compound which is liberated as gaseous oxygen when the compound comes in contact with water.

In carrying out the present invention any perborate can be employed such as those prepared from the reaction of a simple or complex borate with hydrogen peroxide, e.g., reaction of hydrogen peroxide with either a metaborate, tetraborate or pentaborate, or those prepared by reaction of hydrogen peroxide and boric acid or boric oxide, or those prepared by reaction of sodium peroxide and boric acid or borates. Among the compounds which can be employed are ammonium perborate, lithium perborate, sodium perborate, potassium perborate, rubidium perborate, cesium perborate, magnesium perborate calcium perborate, strontium perborate, barium perborate and zinc perborate. Each of these compounds can be in any of their states of hydration. The preferred compounds is sodium perborate; this may be employed either in its monohydrate, dihydrate, trihydrate or tetrahydrate form.

The perborate thus defined above is ground to a fine size preferably less than 2 mm. in diameter, and placed in a vertically positioned hollow tube reactor. An inert gas is then passed upward through the bottom of the tube at a rate sufficient to maintain the average distance between the particles at least about 0.07 times the diameter of the particles. The gas used to suspend and separate the particles must be inert to the initial perborate compound and to the final product. Examples of such gases include argon, nitrogen, air, etc.

The resulting suspended mass may then be heated by internal or external means. Internal heating of the particles can be obtained by heating the upward flowing inert gas stream until the desired temperature has been reached. An alternate method is to externally heat the tubular reactor, by use of a suitable heating jacket, so that the suspended particles in the reactor are heated by the transfer of heat through the walls of the reactor.

Heating is carried out at a temperature between 50° and 250° C. so that an acceptable reaction rate is obtained without excessive exotherm. The temperature of the particles in the reactor must never be permitted to go above the melting point of the particles suspended therein. If this occurs the particles will become tacky and will agglomerate; these will then be too heavy to be supported by the suspending gas.

The conversion of sodium perborate monohydrate to the desired product is best carried out at about 110° C. over a five-hour period. At higher temperatures, e.g., 120° C. and above, the reaction becomes highly exothermic. Therefore, if one desired to operate at these higher temperatures, the temperature should be increased slowly enough to prevent the reaction from getting out of control.

The temperature profile of the reaction depends in large measure upon the specific perborate employed in the reaction. If one commences with sodium perborate tetrahydrate, which melts at 65° C., a starting temperature of about 55° C. should be used. Thereafter the temperature should be raised gradually to about 110° C. until conversion has been affected. During this conversion the tetrahydrate converts to the monohydrate form during the initial portion of the reaction. Thereafter raising the temperature above 65° C. does not melt the newly formed monohydrate and this can be converted to the desired product under the same conditions used for sodium perborate monohydrate per se.

In addition to controlling the temperature of the suspended particles, the ambient water vapor content must be maintained below that point at which the water vapor decomposes the perborate-derived product. That is, the water evolved in the reaction that is carried off by the inert gas must be removed at a rate sufficient to prevent the water vapor from decomposing the final product. The exact water vapor level which can be tolerated varies with different perborate salts and therefore must be determined for each salt. In the case of sodium perborate, water vapor concentrations as high as 20 mg./l. can be tolerated without decomposition of the final perborate-derived product. However, in the case of potassium perborate substantially lower water vapor concentrations must be present to prevent decomposition of the final product; water vapor concentrations above 1 mg./l. are generally not recommended in the manufacture of this perborate-derived compound.

In order to achieve proper removal of the water vapor from the surface of the perborate particles it is necessary that the discrete particles be separated by an average space of at least about 0.07 times the diameter of the particles. This separation permits the inert gas to sweep away the water evolved during the conversion without having any localized water build up which can decompose the final product., In carrying out the reaction, it is generally preferred to grind the initial perborate reactant to a size of less than 2 mm. in diameter. This is desirable because the smaller particles permit better heat exchange in the reactor and facilitate removal of water vapor from the surface of the particles by the up-flowing inert gas. Fine grinding increases the surface area of a unit sample of the perborate reactant and thereby facilitates the exchange of both heat and water vapor during the ensuing reaction.

The rate of flow of the inert gas should be sufficient to suspend the perborate charge so that the distance between the particles is at least about 0.07 times the diameter of the particles but not sufficient to blow out portions of the charge from the top of the reactor. The rate of flow needed to achieve this will vary considerably depending upon the size and shape of the particle, density of the particle being suspended and the viscosity of the suspending gas. In general, a gas flow rate of from 7 to 25 cm./sec. through the reactor has been found satisfactory to maintain the particles suspended and separated from one another as set forth above.

The present reaction can be operated either batchwise or on a continuous basis. In batch operation a charge on the perborate is suspended in the reactor, treated at elevated temperatures for a given reaction period, e.g., five hours, and the entire charge is then removed. In continuous operation, a perborate salt is continually added to a suspended reaction mass in the reactor and the perborate-derived product is continually removed. The rate of addition and the rate of withdrawal of the product are adjusted, relative to the suspended mass, so that the average residence time of the added perborate is within the prescribed limits, e.g., about 2 to 5 hours. If desired, more than one reactor can be used by connecting a plurality of these reactors in series so that different stages of the conversion can be run at different temperatures. For example, the initial stage which may be operated at a lower temperature can be carried out in one reactor and subsequent portions of the conversion can be carried out in one or more additional reactors at progressively higher temperatures.

In one embodiment of the invention a humidity sensing device is placed in the gas stream above the suspended particles and the temperature of the particles is controlled so that the rate of water evolution, and consequently the relative humidity of the gas stream, does not go above prescribed limits. In general as the temperature of the particles increases, the rate of reaction, and thus the rate of water evolution, also increases. Thus, a simple method for controlling the water vapor content of the ambient atmosphere of the reaction particles is to control the reaction temperatures.

The instant perborate-derived products are useful in decreasing the dissolving time of solid materials in water. For example, the present effervescent products can be incorporated with various detergent formulations into solid compacted masses, e.g., detergent tablets, in order to disperse the ingredients in the compact quickly when it is placed in water. The use of these products in admixture with ingredients other than detergents, is also within the contemplated utility thereof.

The following examples are given to illustrate the present invention and are not deemed to be limiting thereof.

Example 1

One hundred fifty grams of commercial sodium perborate monohydrate having a bulk density of 0.68 g./l. and an average particle size of from 0.1 to 0.6 mm. was charged into a 3.2 cm. diameter glass column having a volume of 480 cc. The column had a heating jacket through which a liquid heat exchange medium could flow. Air was admitted into the column through a fritted glass plate located in the bottom of the column at a rate of 10 cm./sec. to suspend the perborate charge. The charge increased in volume after admission of the air from about 220 cc. to about 400 cc. Warm oil having a temperature of 112° C. was flowed through the jacket continuously to maintain the temperature within the column at 110° C. The perborate charge was held at this temperature for 5½ hours. The maximum humidity content of the overhead gas stream was about 17 mg./l. Thereafter the contents of the column were removed and 125 g. of a free-flowing material that effervesces on contact with water was obtained. On analysis this product contained 9.56% by weight of gaseous oxygen.

Example 2

This example was carried out in a reactor 18 in. in diameter, 2½ ft. high, and having a conical bottom. The reactor had an air inlet in the vertex of the cone and a heating jacket surrounding the cylindrical portion of the reactor. Dry air was passed upward through the reactor at a velocity of 0.35 ft./sec. in the cylindrical portion of the reactor. One hundred pounds of commercial sodium perborate monohydrate was then charged into the reactor. A heating fluid having a temperature of 110° C. was circulated through the jacket continuously to maintain the suspended perborate charge at a temperature of 105° C. The reaction was continued for 2½ hours. Thereafter a free-flowing material that effervesces on contact with water was obtained having a gaseous oxygen content of 6.0% by weight.

Example 3

A reactor was prepared from a 2.54 cm. diameter glass column having a volume of 400 ml. The column had a chromel wire heating coil wrapped about its outer surface. The coil was insulated for heat loss by means of an asbestos cover. Dry, carbon dioxide-free air was passed upward through a fritted glass plate located in the bottom of the column at a velocity of 10 cm./sec. Thereafter 100 g. of potassium perborate (active oxygen content of 12.7%) was charged into the column. The overhead air stream was passed through a fiilter for dust removal and then to a humidity sensor. An electric current to the heating coil was regulated manually with a variable voltage transformer so that the temperature of the charge was raised slowly without exceeding a humidity content of about 1 mg./l. in the overhead gas stream. After reaction for four hours, a final temperature of 160° C. was reached. Thereafter a free-flowing product that effervesces in contact with water was removed; it analyzed 3.07% by weight gaseous oxygen.

Example 4

The procedure of Example 1 was repeated in substantially the same manner using separate charges of magnesium perborate and ammonium perborate. In each case a free-flowing product that effervesces and liberates oxygen on contact with water was obtained.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process of converting a salt selected from the group consisting of ammonium perborates, alkali metal perborates, and alkaline arth metal perborates to a perborate-derived product which effervesces and liberates oxygen gas when in contact with water which comprises, suspending particles of said salt in a stream of inert gas and maintaining the average distance between said particles at least about 0.07 times the diameter of said particles, heating said particles while in a suspended state to a temperature of from about 50° C. to about 250° C., but below the melting point of said particles during the conversion, maintaining the water vapor content of the inert gas surrounding the suspended particles sufficiently low that it does not decompose the perborate-derived product, continuing said heating until water envolved during conversion has been removed, and recovering a finely divided, free-flowing perborate-derived product which effervesces when in contact with water.

2. Process of claim 1 wherein the water vapor content of the inert gas is not above 20 mg./l.

3. Process of claim 1 wherein said inert gas is air.

4. Process of claim 1 wherein said salt is heated to a temperature of from 50° C. to 110° C.

5. Process of converting a sodium perborate to a perborate-derived product which effervesces and liberates oxygen gas when in contact with water which comprises, suspending particles of said sodium perborate no larger than about 2 mm. in diameter in a stream of inert gas, and maintaining the average distance between said particles at least about 0.07 times the diameter of said particles, heating said particles while in a suspended state to a temperature of from about 50° C. to about 110° C. but below the melting point of said particles until water envolved during the conversion has been removed, maintaining the water vapor content of the inert gas surrounding the suspended particles no higher than about 20 mg./l., and recovering a finely divided, free-flowing perborate-derived product which effervesces when in contact with water.

References Cited

UNITED STATES PATENTS

| 1,950,320 | 3/1934 | Muller | 23—60 X |
| 2,308,992 | 1/1943 | Mertens | 23—60 |
| 2,979,464 | 4/1961 | Pistor | 23—60 X |
| 3,311,446 | 3/1967 | Kegelart | 23—60 |

EARL C. THOMAS, *Primary Examiner.*

H. T. CARTER, *Assistant Examiner.*

U.S. Cl. X.R.

252—186